Jan. 13, 1970　　　D. R. FRANCK ET AL　　　3,489,412
HOCKEY STICK WITH CURVED BLADE
Filed June 26, 1967　　　　　　　　　　　　　　　3 Sheets-Sheet 1
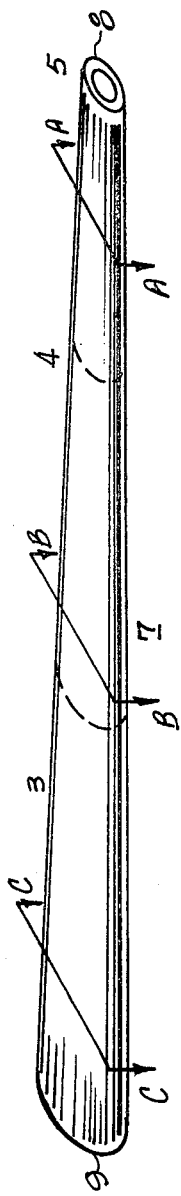
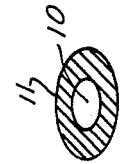
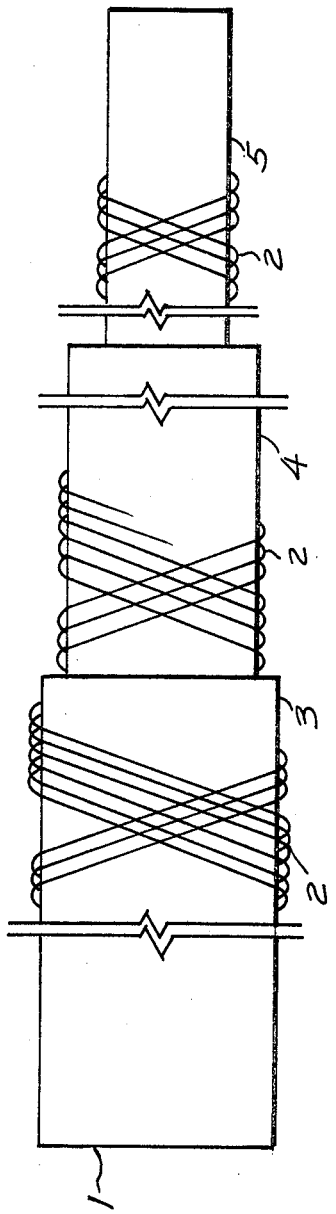
LOUIS B. ALLEN
DONALD R. FRANCK
INVENTOR
BY John W Young
ATTORNEY Jan. 13, 1970      D. R. FRANCK ET AL      3,489,412
HOCKEY STICK WITH CURVED BLADE Filed June 26, 1967      3 Sheets-Sheet 2

LOUIS B ALLEN
DONALD R. FRANCK
INVENTORS
BY John W. Young
ATTORNEY

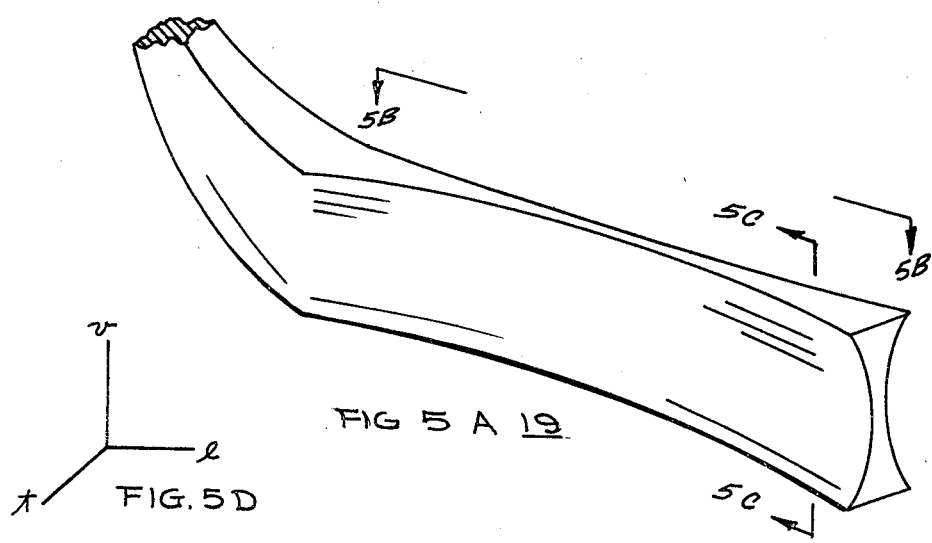
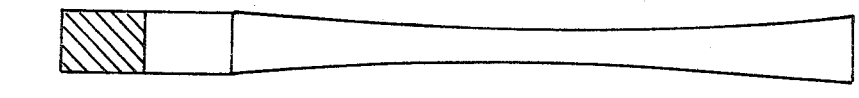
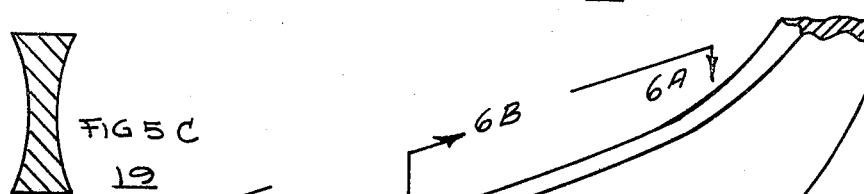
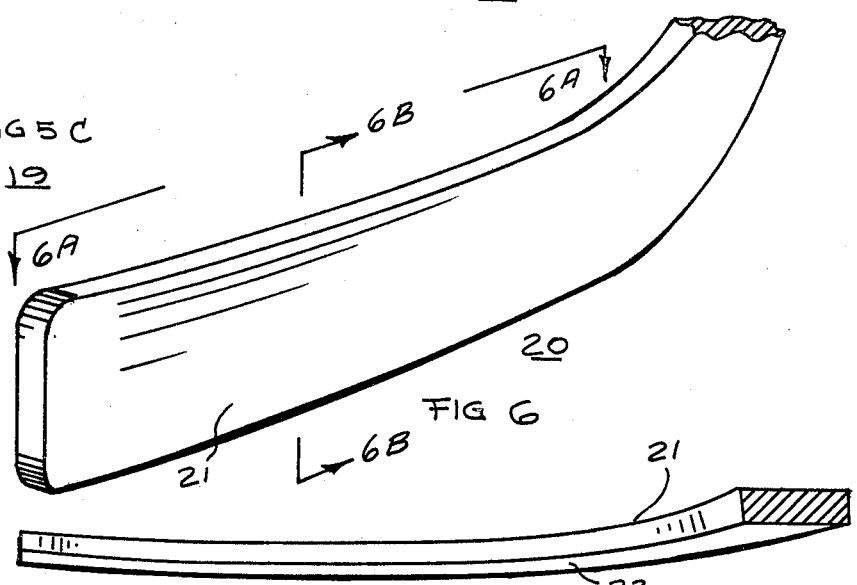
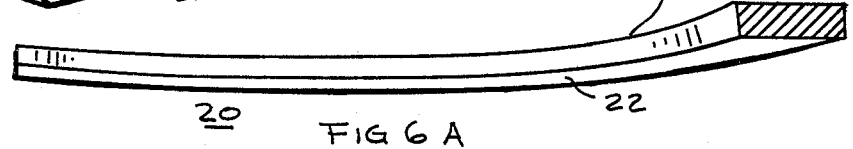
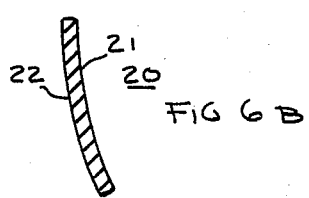
LOUIS B. ALLEN
DONALD R. FRANCK
INVENTORS

United States Patent Office 3,489,412
Patented Jan. 13, 1970

3,489,412
HOCKEY STICK WITH CURVED BLADE
Donald R. Franck, Endicott, and Louis B. Allen, Binghamton, N.Y., assignors to Southern Tier Civic Center, Inc., Endicott, N.Y., a corporation of New York
Filed June 26, 1967, Ser. No. 648,787
Int. Cl. A63b 59/12
U.S. Cl. 273—67                    3 Claims

ABSTRACT OF THE DISCLOSURE

This invention relates to an improved blade or striking surface for a hockey stick and more particularly, to a hockey stick blade that is curved in both the vertical and/or longitudinal dimensions, on one or both sides of the blade.

---

Hockey sticks are conventionally constructed of wood, and, necessarily, because of this limitation, are usually handcrafted to specifications. A hockey stick so constructed is inherently subjected, through use, to splintering, cracking, warping, delaminating, absorbing moisture, etc. Further variations in the various characteristics and parameters develop through the extended use of the wooden hockey stick; for example, the stiffness and resiliency characteristics of the wooden hockey stick deteriorate and change with age, thus reducing its effectiveness and desirability.

Another deficiency which a wooden hockey stick exhibits is that the weight distribution of the stick is basically predetermined by the design and that the design is primarily predetermined by the material of composition; for example, the blade of the stick is conventionally constructed in a linear fashion, in both its horizontal and vertical dimensions, simply because it is uneconomical and impractical to hand craft a blade with curved surfaces in one or both of its dimensions.

It is well known in the art to add additional mechanical supports, such as a fiber glass wrap, to the blade to achieve or obtain a particular weight and extend the life of the stick. This method of obtaining the desired effect has proved to be unsuccessful and impractical, over an extended use of the device, as the extended use ordinarily results in a general loss of integrity; that is, the wrap deteriorates, frays, and delaminates with the extended use thereof; resulting in the general overall loss in configuration, weight, stiffness, etc.

Another related problem of hockey sticks, constructed of wood, is in the design of the shaft of the stick to obtain maximum strength and, at the same time, stiffness, while retaining the desired and specified weight characteristics. In the present invention, increased strength and stiffness is obtained by constructing the stick of a material, other than wood, such as a fiberglass reinforced organic or inorganic resinous material, and selectively distributing the weight, in the shaft and/or blade, to obtain the maximum strength, stiffness, resiliency, etc., as desired. This construction further contributes to the diminution of the overall loss of integrity, shattering, splitting, splintering, cracking, fraying, which is concomitant with extended use of a wooden hockey stick.

For other objects and for a better understanding of the invention, reference may be had to the following detailed description taken in connection with the accompanying drawings in which:

FIG. 1 is a perspective view of a preferred embodiment of a mandrel used to fabricate the shaft of the hockey stick.

FIG. 2 is a perspective view of a preferred embodiment of a shaft.

FIG. 3A is a cross sectional view of the shaft taken along section lines A—A in FIG. 2.

FIG. 3B is a cross sectional view of the shaft taken along section lines B—B in FIG. 2.

FIG. 3C is a cross sectional view of the shaft taken along section lines C—C in FIG. 2.

FIG. 5A is a perspective view of a preferred embodiment of the blade.

FIG. 5B is a view of the blade taken along section lines 5B—5B in FIG. 5A.

FIG. 5C is a view of the blade taken along section lines 5C—5C in FIG. 5A.

FIG. 5D is a geometrical representation of the vertical longitudinal and width dimensions of the blade.

FIG. 6 is a perspective view of a second preferred embodiment of the blade.

FIG. 6A is a view of the blade taken along section lines 6A—6A in FIG. 6.

FIG. 6B is a view of the blade taken along section lines 6B—6B in FIG. 6.

Figure 7:
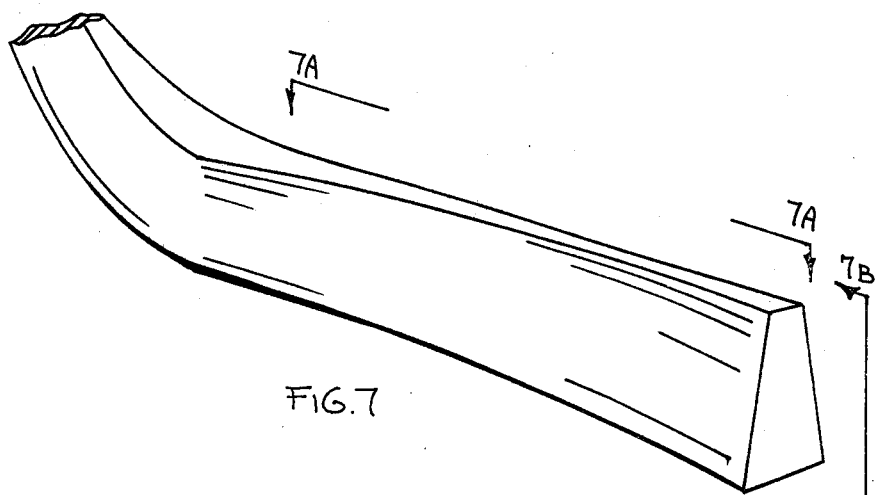
FIG. 7 is a further perspective view of another embidiment of the blade.

Generally, in this invention, the shaft and blade of the hockey stick are separately constructed and are then securely fitted together at the lower end of the shaft, as one integral piece; the construction of the shaft to the blade will be discussed in detail hereafter.

The handle shaft and blade are constructed, initially, by winding a fiber, such as fiberglass, under tension, on a form, mold or mandrel and then encasing or coating the fiber with an epoxy type resin material, which acts as a binding agent for the fiber and constitutes the outer surface of the handle shaft and blade. Conventional winding techniques are used in the process to maintain the fiber under tension as it is placed on the mandrel. The mandrel, together with the fibers thereon, are then placed into a predesigned die or mold and encased with an organic or inorganic resinous material such as epoxy resin, preferably under heat and pressure. After the fibers are encased in the epoxy resin, the mandrel is removed from the shaft and the elements are securely joined, in a fashion which, again, will be discussed in detail hereinafter.

This technique allows for selective distribution of weight in the shaft and blade, by selectively varying the thickness or specific gravity thereof, thereby permitting the shaft and blade to be strengthened and stiffened in the critical and desired areas; resulting in an increased lifetime of the hockey stick, greater overall strength; selective stiffness; an increase in the impact and flexural strength of the overall hockey stick; and an integral hockey stick eliminating serious deficiency heretofore inherently found in wooden hockey sticks, such as splitting, shattering, splintering, cracking, delaminating, etc.

In the preferred embodiment of the invention, a mandrel 1, which is fabricated of wire, or the like, is used for the basic form of the handle shaft of the hockey stick, see FIG. 1.

A fiber 2, such as fiberglass, is wound on mandrel 1, by conventional filament winding techniques. Mandrel 1 is longitudinally composed of three sections 3, 4, and 5, which have cross sections of diminishing sizes respectively; the cross sectional area of section 3 being greater than the cross sectional area of section 4, and the cross sectional area of section 4 being greater than that of section 5.

Fiber 2 is, initially, uniformly longitudinally wound on section 5 of mandrel 1 until the cross sectional area of section 5, together with fiber 2 wound thereon, is equal to the cross sectional area of section 4. Fiber 2 then is uniformally longitudinally wound on sections 4 and 5 until the cross sectional area of sections 4 and 5, together with the fiber 2 are wound thereon, are equal to the cross sectional area of section 3.

Fiber 2 is then selectively, longitudinally wound on sections 3, 4, and 5 of mandrel 1 to provide a tapering effect, with the blade end of shaft 7, see FIG. 2, preferably being smaller in diameter than the handle end of shaft 7. Mandrel 1 and fiber 2, wound thereon, as described hereinbefore, are placed in a die or mold and encased in an organic or inorganic resinous material, such as an epoxy resin, preferably under heat and pressure, forming handle shaft 7, as shown in FIG. 2. The epoxy resin not only acts as a binding agent as to fibers 2 but constitutes the external surface of shaft 7.

This particular preferred construction of shaft 7 of the hockey stick allows for selective longitudinal distribution of weight in handle shaft 7 to obtain added strength and stiffness in the areas subjected to the greatest stresses, while maintaining a specific overall weight. Additionally, various grades of fiber 2 can be used to vary the weight distribution.

The lower or blade end 8 of shaft 7, the end to which the blade will be attached, will have a thicker wall area than the upper or handle end 9 of shaft 7. For example, referring to FIGS. 3A, 3B, and 3C, which represent cross sectional areas of shaft 7 taken respectively along sectional lines A—A, B—B and C—C. As seen in FIG. 3A, the center portion 10 of shaft 7 is hollow, center portion 10 extending longitudinally for the entire length of shaft 7. The exterior wall section 11 of section 5, as shown in FIG. 3A, is thick, as compared to the thickness of wall sections 12 and 13, as shown in FIGS. 3B and 3C, of sections 3 and 4 of shaft 7. This additional thickness and weight not only lends strength and stiffness to blade end 8, of shaft 7, while retaining the required and specified overall weight, but further, and this is an important feature of this invention, permits a harder "shot" to be had with a given stroke. That is, by selectively distributing the weight in blade end 8 of shaft 7 the kinetic energy imparted to a puck through the blade of the hockey stick is increased, as is readily observable, thereby obtaining an increase in the kinetic energy or velocity of the puck upon impact. It is also noted, although this does not constitute part of the present invention, that through the use of the epoxy resin shaft 7 can be colored in any fashion or to any hue by incorporating the desired pigments in the epoxy resin compound. The construction of shaft 7, in order to determine the various parameters in weight, flexural strength, impact strength, stiffness, etc., to obtain the most efficient construction becomes quite complex. A hockey stick usually weighs approximately five hundred fifty (550) grams; the shaft normally weighing approximately four hundred (400) grams and the blade normally weighing approximately one hundred fifty (150) grams.

It has been found that a decided advantage can be obtained by reducing the weight of the shaft from approximately 400 grams to approximately 250 grams, with wall thicknesses varying from .040 inch to .080 inch. This permits the weight of the blade to be increased from approximately 150 grams to 250 to 300 grams, permitting "harder" shots than can be obtained with an identical stroke with the conventional hockey stick.

It is also pointed out that shaft 7, because of its hollow construction can be loaded or weighted, as desired, to further increase the stiffness and strength of shaft 7 and/or to modify or vary its center of gravity or balance point. This can be accomplished by inserting a wire stiffener, balance control plug or the like, in center portion 10 of shaft 7.

Figure 4:
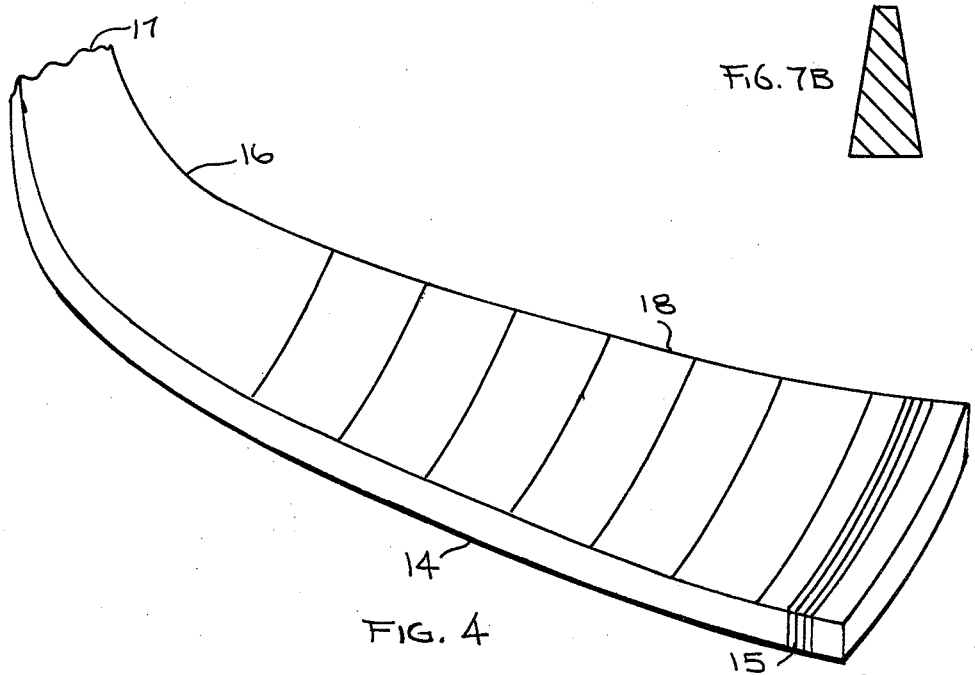
FIG. 4 is a perspective view of a preferred embodiment of a mandrel used in fabricating the blade.

The blade of the stick is manufactured in a manner similar to the technique used in constructing shaft 7. Referring now to FIG. 4, a wire mandrel 14 is completely covered with a high strength fiber 15, such as fiberglass. Mandrel 14 together with fiber 15, is placed in a matched die or mold and encased with an organic or inorganic resin, of a selected pigment, if desired, pressure and heat being applied to yield a monolithic mass. The shaft portion 16 of mandrel 14 includes an angled stub 17 to facilitate connection with shaft 7. It is readily observable that the angle shaft portion 16 creates with the blade portion 18 of the blade can be varied as desired, the die or mold being constructed accordingly.

The die or mold in which the blade is molded is constructed to provide blade surfaces which can be curved, tapered or angled, as desired. An important feature of this invention is the construction of a hockey stick blade with a compound curved surface. With this in mind it is noted that the blade may be curved either in its longitudinal, vertical or width dimension, and on either one side or both sides of the blade.

Referring now to FIGS. 5A through 5D, blade 19, as shown therein, is curved in both the vertical and longitudinal dimensions on both sides of blade 19. In FIG. 5D, $v$ depicts the vertical dimension, $l$ represents the longitudinal dimension, and $t$ represents the dimension of the blade thickness. FIG. 5B represents the configuration of the blade as viewed along sectional lines 5B and FIG. 5C represents the configuration of the blade as viewed along sections lines 5C. In this particular preferred embodiment blade 19 is curved in both its vertical dimension $v$ and its longitudinal dimension $l$, on both faces of blade 19. Thus by utilizing the techniques discussed in detail hereinbefore, it is possible to provide blade 19 with a striking surface that is curved, or tapered, in two or more dimensions, which heretobefore has not been possible, merely by constructing the mold accordingly. This configuration provides many and obvious advantages over the conventional wooden hockey stick, to wit: better puck control, inasmuch as the striking surface of the blade is curved in at least two dimension; an integral monolithic blade which is relatively impervious to water absorption; a stiffer blade exhibiting greater impact strength; and a blade which can be used equally well with a forehand or backhand shot. It is further obvious that by selectively controlling the parameters, such as blade thickness and curve design an improved wearing and lasting quality is obtained.

The integral hockey stick, shaft and blade, etc. ordinarily weighs 550 grams or thereabouts. By utilizing the principles cited hereinbefore, the weight in shaft 7, FIG. 2, and blade 19, FIG. 5A, can be selectively varied; and, by placing more weight in blade 19 and reducing the weight of shaft 7, while maintaining the necessary and required overall specifications, a harder shot can be made with the same shaft velocity, as the kinetic energy imparted to a hockey puck by the blade is increased.

It is obvious, utilizing the principles recited above, that at least sixteen distinct configurations of blade 19 can be obtained, to wit (C is curved and ST is straight):

| Longitudinal dimension ($l$) | | Vertical dimension ($v$) | |
| --- | --- | --- | --- |
| Rear of blade | Front of blade | Rear of blade | Front of blade |
| ST | ST | ST | ST |
| C | ST | ST | ST |
| ST | C | ST | ST |
| ST | ST | C | ST |
| ST | ST | ST | C |
| C | C | C | C |
| ST | C | C | C |
| C | ST | C | C |
| C | C | ST | C |
| ST | ST | C | ST |
| ST | C | ST | C |
| C | ST | C | C |
| C | ST | ST | ST |
| C | C | ST | C |
| C | C | ST | C |
| C | ST | C | ST |

Figure 7A:
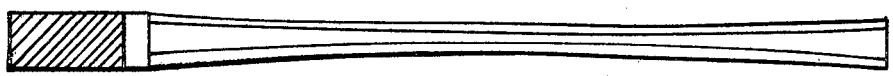
FIG. 7A is a view of the blade taken along section lines 7A—7A in FIG. 7.
Figure 7B:
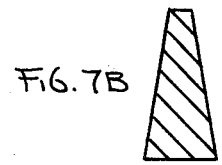
FIG. 7B is a view of the blade taken along section lines 7B—7B in FIG. 7.

For example, referring to FIGS. 6, 6A and 6B blade 20 can be molded to exhibit a concavely curved surface, in all three of its dimensions, $v$, $l$ and $t$, on the striking face 21; thus, striking face 21 becomes parabolic in shape, greatly increasing the accuracy of a shot. The thickness T of blade 20 is maintained uniform throughout the longitudinal length $l$, allowing more weight to be concentrated in the shaft and/or neck 23 of blade 20. Each variation provides aspects, such as "feel," "control," "accuracy," "flexibility," etc., which the individual hockey player will appreciate, and, depending on the individual, each variation will constitute a preferred embodiment. It is noted that although only sixteen variations have been noted that the parameters can be indefinitely increased by the use of curved surfaces other than a concave curved surface, as shown in FIG. 5A, and by combining curved and tapered surfaces, as shown in FIGS. 7, 7A and 7B.

Shaft 7 and blade 19 can be joined in a variety of ways, however, the preferred technique is a molded blade and shaft combination. In this method matched metal molds are used to mold a contoured blade and shaft combination. The preformed shaft 7 and blade 19 are placed in the matched mold; blade end 8 of shaft 7 nesting in shaft portion 16 of blade 19. Wet preformed glass mat, i.e. fiberglass, or glass cloth is placed above and below the junction of shaft 7 with blade 19. A plug or insert, if necessary, can be inserted in the hollow center portion 10 of shaft 7 to prevent shaft 7 from collapsing. The matched mold is closed and shaft 7 and blade 19 are fused together to create a single integral piece. It is obvious that shaft 7 and blade 19 can also be joined by the conventional tongue and groove method, or in any similar fashion.

Having shown and described a preferred embodiment of the present invention, by way of example, it should be realized that structural changes could be made and other examples given without departing from either the spirit or scope of this invention. For example, the stick could be manufactured in three pieces without departing from the scope of this invention.

I claim:

1. A hockey stick, including a handle shaft and a blade attached to said shaft, and extending angularly therefrom; said blade having first, second and third dimensions; said first dimension being a longitudinal dimension of substantially greater length than said second and third dimensions and defining the longitudinal axis of said blade; said second dimension being a vertical dimension and defining the vertical axis of said blade; and said third dimension defining the width dimension of said blade; wherein said blade is curved inwardly along the longitudinal dimension on both sides of said blade to provide a striking surface on each side thereof.

2. A hockey stick, including a handle shaft and a blade attached to said shaft, and extending angularly therefrom; said blade having first, second and third dimensions; said first dimension being a longitudinal dimension of substantially greater length than said second and third dimensions and defining the longitudinal axis of said blade; said second dimension being a vertical dimension and being the vertical axis of said blade; and said third dimension defining the width dimension of said blade, wherein the striking surface of said blade formed by the first and second dimensions is curved in the longitudinal and vertical dimensions.

3. A hockey stick in accordance with claim 2, wherein said blade is curved in the vertical and longitudinal dimensions on both sides of said blade.

References Cited

UNITED STATES PATENTS 2,472,978  6/1949  Mahon _____ 273—175 X

FOREIGN PATENTS 14,313  10/1904  Great Britain.
706,285  3/1965  Canada.

RICHARD C. PINKHAM, Primary Examiner

R. J. APLEY, Assistant Examiner

U.S. Cl. X.R.

273—168, 175